(12) United States Patent
Suzuki et al.

(10) Patent No.: US 7,875,179 B2
(45) Date of Patent: Jan. 25, 2011

(54) SIDE STREAM TYPE MEMBRANE BIOREACTOR PROCESS

(75) Inventors: Shigehiro Suzuki, Tokyo (JP);
Motoharu Noguchi, Tokyo (JP);
Koichiro Kando, Tokyo (JP)

(73) Assignee: Metawater Co., Ltd., Tokyo (JP)

( * ) Notice: Subject to any disclaimer, the term of this patent is extended or adjusted under 35 U.S.C. 154(b) by 0 days.

(21) Appl. No.: 12/817,492

(22) Filed: Jun. 17, 2010

(65) Prior Publication Data

US 2010/0264081 A1 Oct. 21, 2010

Related U.S. Application Data

(63) Continuation of application No. PCT/JP2008/050338, filed on Jan. 15, 2008.

(51) Int. Cl.
*C02F 3/00* (2006.01)
(52) U.S. Cl. .................. 210/607; 210/623; 210/624; 210/625; 210/626; 210/627; 210/760; 210/798
(58) Field of Classification Search ............... 210/607, 210/623–627, 760, 798
See application file for complete search history.

(56) References Cited

U.S. PATENT DOCUMENTS 5,851,399 A * 12/1998 Leitzke .................. 210/605

2006/0213833 A1 9/2006 Kando et al.

FOREIGN PATENT DOCUMENTS

| JP | 2000-218294 A1 | 8/2000 |
| JP | 2001-070761 A1 | 3/2001 |
| JP | 2001-300576 A1 | 10/2001 |
| JP | 2003-033764 A1 | 2/2003 |
| JP | 2004-249235 A1 | 9/2004 |
| JP | 2006-297376 A1 | 11/2006 |

* cited by examiner

*Primary Examiner*—Chester T Barry
(74) *Attorney, Agent, or Firm*—Burr & Brown

(57) ABSTRACT

The invention provides a side stream type membrane bioreactor process which does not cause an excessive fall in the MLSS concentration in a bioreactor, does not require any additional effluent treatment facility for discharging backwash effluent, and can further ensure the stability of the membrane filtration performance of a separation membrane. According to the invention, in a side stream type membrane bioreactor process, a backwash effluent containing foulants that are generated by backwashing a separation membrane is collected in a backwash effluent tank, and subjected to ozone treatment, and the resultant is returned to a bioreactor. By this ozone treatment, the foulants close to the membrane pore size of the separation membrane are made fine or are made into a state be easily taken into activated sludge flocs. Therefore, even when the treated effluent is returned to the bioreactor, the membrane filtration performance of the separation membrane is not deteriorated.

7 Claims, 1 Drawing Sheet

SIDE STREAM TYPE MEMBRANE BIOREACTOR PROCESS

TECHNICAL FIELD

The present invention relates to a side stream type membrane bioreactor process used to treat an organic wastewater that may be of various kinds, examples thereof including sewage, sidestreams, an industrial effluent, leachate, night soil, an agricultural effluent, barn, and a cultivation effluent. The invention relates in particular to a handling of a backwash effluent generated when a side stream type separation membrane is backwashed.

BACKGROUND ART

A process for treating an organic wastewater as described above is generally an activated sludge process, wherein organic substances are subjected to biodegradation with microorganisms in a bioreactor. Water in the tank of the bioreactor is sent to a final settling-tank, and then subjected to solid-liquid separation by gravitational sedimentation so that the resultant supernatant water is taken out as treated water. However, this process requires a long period of time for the gravitational sedimentation; it is therefore final settling-tank needs large space area. Thus, mainly in sewage treatment plants, in particular, wherein a large space area is not easily secured, a membrane-separation activated sludge process (membrane bioreactor process), wherein the final sedimentation tank is substituted with a separation membrane, is often employed.

This membrane bioreactor process is roughly classified into a submersed membrane bioreactor process, wherein a separation membrane is submersed inside a bioreactor and water in the bioreactor is directly filtrated, and a side stream type membrane bioreactor process, wherein a separation membrane is placed outside a bioreactor, and water in the bioreactor is circulated to the separation membrane while the water is filtrated therewith. In the submersed membrane bioreactor process, a separation membrane is submersed in a bioreactor; therefore, it is impossible to remove particles (foulant) captured on the membrane and having the size close to a membrane pore size from the bioreactor to the outside. For this reason, the process has a problem that it is difficult to keep the stability of the filtration performance of the membrane certainly.

On the other hand, in the side stream type membrane bioreactor process, at the time when the foulants accumulate on the separation membrane, these foulants can be removed from the membrane by backwashing. The resultant backwash effluent is usually returned to the bioreactor through a route for the circulation of water in the bioreactor, and then reused. In some cases, the foulants in the backwash effluent are in the form of pellets. However, after the pellets are returned to the bioreactor, the pellets are aerated and broken into original particles.

The foulants returned to the bioreactor are partially taken into flocs of the activated sludge therein. However, the amount of the foulants taken in the activated sludge flocs decreases in wintertime when the activity of the sludge is lowered. Thus, the foulants increase in the bioreactor. Therefore, when a backwash effluent is returned to the bioreactor, the stability of the membrane filtration performance becomes difficult to ensure in the same reason as in the submersed membrane bioreactor process.

Thus, as disclosed in JP-A-2004-249235, which is Patent Document 1, it is suggested to discharge a backwash effluent from a separation membrane placed outside a bioreactor to the outside. However, according to this method, the MLSS concentration in the bioreactor falls excessively, and the biodegradation ability of organisms in the bioreactor may be reduced. Additionally, in order to treat the backwash effluent discharged to the outside, it becomes necessary to locate another effluent treatment facility. Thus, the process has a problem of lack of practicability.

Patent Document 1: JP-A-2004-249235

DISCLOSURE OF THE INVENTION

Problems to be Solved by the Invention

Accordingly, an object of the invention is to solve the problems in the prior art, and provide a side stream type membrane bioreactor process which does not cause an excessive fall in the MLSS concentration in a bioreactor, does not require any additional effluent treatment facility for discharging a backwash effluent, and can further ensure the stability of the membrane filtration performance of a separation membrane.

Means for Solving the Problems

The invention, which has been made to solve the problems, is a side stream type membrane bioreactor process of circulating in-tank water inside a bioreactor into a separation membrane placed outside the bioreactor, thereby taking out filtrated water, wherein a backwash effluent containing foulants that are generated by backwashing the separation membrane is subjected to ozone treatment, thereby making the foulants fine or making them into a state to be easily taken into activated sludge flocs, and further the treated effluent is returned to the bioreactor.

In the invention, it is preferred that by the ozone treatment, the foulants are made into sizes finer than the membrane pore size of the separation membrane. In the invention, it is also preferred that the supply amount of ozone in the ozone treatment is set into the range of 20 to 100 $mgO_3$ per liter of the backwash effluent.

In the invention, a ceramic monolithic membrane may be used as the separation membrane. In this case, the separation membrane preferably has a primary side channel with a circular cross-section or a polygonal cross-section.

In the invention, it is preferred that the backwash effluent is subjected to the ozone treatment and further returned to the bioreactor, thereby keeping the MLSS concentration in the in-tank water in the bioreactor in the range of 5000 to 20000 mg/L. The frequency of the backwashing is preferably in the range of once every 10 minutes to once every 3 hours.

ADVANTAGEOUS EFFECTS OF THE INVENTION

According to the invention, a backwash effluent is subjected to ozone treatment to make foulants therein fine; therefore, the foulants returned to the bioreactor turn into fine particles which do not foul the membrane, so that the fine particles do not foul the membrane again. Accordingly, it does not occur that the foulant amount in the bioreactor increases as in the prior art. Thus, the stability of the membrane filtration performance of the separation membrane can be ensured. Additionally, the total amount of the backwash effluent can be returned to the bioreactor; thus, the process does not require any additional effluent treatment facility for discharging the backwash effluent. Moreover, the backwash effluent is not discharged to the outside; thus, the MLSS concentration in the bioreactor do not fall excessively, and the concentration is kept in the range of 5000 to 20000 mg/L so that the biodegradation ability of the bioreactor can be maintained active. In the case that the bioreactor performs a treatment process including biological phosphorus removal, such as an anaerobic anoxic oxic method, the return of the effluent subjected to the ozone treatment into the anaerobic tank makes it possible to supply an organic substance necessary for the biological phosphorus removal, thereby stabilizing the biological phosphorus removal.

Figure 1:
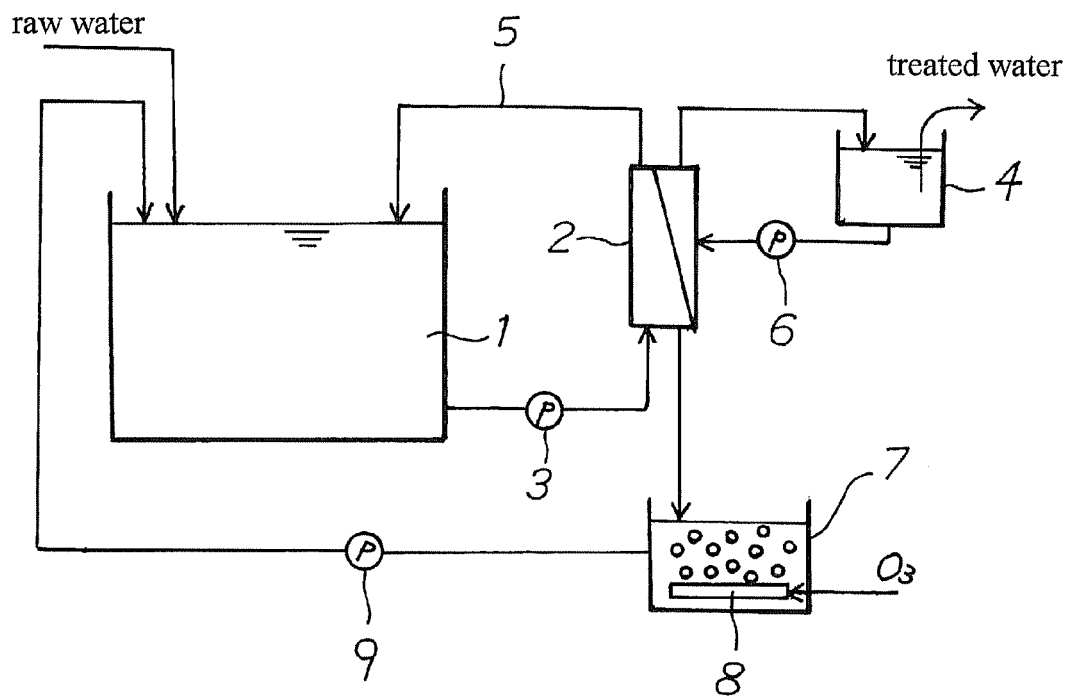
FIG. 1 is an explanatory view illustrating an embodiment of the invention.

REFERENCE NUMBERS 1 bioreactor
2 separation membrane
3 circulating pump
4 treated water tank (effluent tank)
5 return flow pipe channel
6 backwashing pump
7 backwash effluent tank
8 ozone supplying device

BEST MODE FOR CARRYING OUT THE INVENTION

Hereinafter, preferred embodiments of the invention will be described.

In FIG. 1, reference number 1 represents a bioreactor, wherein raw water such as sewage, which is an organic effluent, is subjected to an activated sludge process in the same way as in the prior art. Reference numeral 2 represents a separation membrane placed outside the bioreactor 1. In-tank water in the bioreactor 1 is continuously supplied into a primary side of the membrane by means of a circulating pump 3, so that the water is filtrated through the membrane. This embodiment uses cross flow filtration. The membrane-filtrated water, which has permeated through the membrane to a secondary side of the membrane, is taken out as treated water, into a treated water tank 4 while the concentrated water is returned from the primary side end to the bioreactor 1 through a return flow pipe channel 5.

The species of the separation membrane 2 may be an MF membrane or a UF membrane. The raw material thereof may be either a ceramic or a polymer. The form of the membrane may be any one of a monolithic membrane, a tubular membrane, a flat sheet membrane, and a follow fiber membrane. The manner of applying pressure thereto may be either an internal pressure manner or an external pressure manner. When the membrane is a monolithic membrane or tubular membrane, it is preferred that the channel on the primary side has a circular cross-section or a four or more sided polygonal cross-section. The separation membrane 2 used in this embodiment is a ceramic monolithic membrane manufactured by NGK Insulators, Ltd. This membrane is an MF membrane obtained by making a large number of channels each having a circular cross-section inside a ceramic porous body, and rendering the circumferential surface of each of the channels a membrane plane having a membrane pore size of 0.1 μm.

The use of the side stream type separation membrane 2 makes it possible to conduct solid-liquid separation of the in-tank water in the bioreactor 1 easily, thereby making the size of the whole of the apparatus smaller than that of conventional final settling-tanks. However, solids in the activated sludge and the in-tank water accumulate on the membrane plane of the separation membrane 2. Thus, the circulating pump 3 is stopped periodically or at any time when the transmembrane pressure difference rises. The treated water is then sent from the treated water tank 4 to the secondary side of the separation membrane 2 by means of a backwashing pump 6, so that the membrane is backwashed. The frequency of the backwashing, which varies largely in accordance with the raw water quality, is preferably about once every 10 minutes in a case where the pollution loading of the raw water is high. In a case where the pollution loading is low, the frequency is preferably about once every 3 hours. If the backwashing frequency is too high, the period of the membrane filtration operation is decreased so that the operation rate falls. In contrast, if the backwashing frequency is too low, the transmembrane pressure difference becomes too high. Thus, even when the membrane is backwashed, the permeability of the membrane is not easily restored.

The backwash effluent generated by the backwashing is discharged into a backwash effluent tank 7. The backwash effluent contains therein activated sludge and foulants that have been removed from the membrane. Conventionally, such a backwash effluent is returned, as it is, to the bioreactor 1. In the invention, however, ozone is supplied from an ozone supplying device 8 into the backwash effluent so as to treat the backwash effluent with ozone.

Ozone is a gas having a strong oxidizing power, and has an effect of breaking or decomposing an organic substance. Therefore, the treatment can make the foulants in the backwash effluent fine to be a particle size smaller than the membrane pore size of the separation membrane 2. The ozone amount to be supplied in the ozone treatment for this purpose is smaller than that in ozone treatment intended for sterilization or amount of sludge reduction, thus resulting in a lower running cost. Specifically, it is preferred to set the supply amount of ozone into the range of 20 to 100 $mgO_3$ per liter of the backwash effluent. If the supply amount of ozone is smaller than the range, the effect of breaking or decomposing any organic substance is insufficient and the advantageous effects of the invention cannot be sufficiently obtained. If the supply amount of ozone becomes excessive, the electric power cost for the production of ozone is high and further treatment for decomposing excessive ozone becomes necessary, which results in a cost increase. In this embodiment, ozone is supplied directly into the backwash effluent tank 7; however, it is needless to say that an ozone treating means may be provided separately.

The backwash effluent treated with ozone is returned to the bioreactor 1 by means of a returning pump 9. The foulants close to the membrane pore size have been turned, by reformation of the surface property, to fine particles smaller than the membrane pore size by the ozone treatment, or to substances easily taken into flocs of the activated sludge. For this reason, this return does not cause an increase in the amount of the foulant, which are made of particles close to the membrane pore size, inside the bioreactor 1. According to the invention, therefore, the membrane filtration performance of the separation membrane 2 does not fall rapidly, so that stable filtration can be attained over a long term.

Additionally, according to the invention, the backwash effluent is returned to the bioreactor 1 without being discharged outside the system. Thus, the MLSS concentration in the bioreactor 1 does not fall, and the biodegradation ability of the bioreactor 1 can be kept into a stable state. According to the invention, the MLSS concentration of the in-tank water in the bioreactor can be kept into the range of 5000 to 20000 mg/L. Furthermore, according to the invention, it is unnecessary to provide any additional treatment apparatus for treating the backwash effluent since the backwash effluent is returned to the bioreactor 1 without being discharged outside the system.

EXAMPLE 1

The treatment apparatus illustrated in FIG. 1 was used to conduct an activated sludge treatment of sewage. The MLSS concentration in the bioreactor was set to 10,000 mg/L. The separation membrane was a monolithic ceramic membrane manufactured by NGK Insulators, Ltd., and the membrane pore size thereof was 0.1 μm. In-tank water in the bioreactor was circulated to conduct a cross-flow filtration. The membrane-filtrated water was taken out as treated water.

The filtration operation was stopped at intervals of 1 hour so as to backwash the separation membrane. The backwash effluent containing foulants was collected into the backwash effluent tank, and then ozone was aerated thereinto so as to conduct an ozone treatment. The supply amount of ozone was 100 mgO$_3$ per liter of the backwash effluent. The total amount of the backwash effluent treated with ozone was returned to the bioreactor.

When the case where the ozone treatment was conducted (present example) was compared with a case where no ozone treatment was conducted (conventional example), the examples were equal to each other in treated water quality. However, in the conventional example, the membrane filtration flux of the separation membrane was 2.0 m/day. On the other hand, in the present example, the flux was 2.4 m/day. Thus, it was verified that the membrane filtration performance was greatly improved by the ozone treatment. The MLSS concentration in the bioreactor was kept at a level of 10000 mg/L. Thus, the MLSS concentration did not fall.

EXAMPLE 2

Next, the amount of ozone supplied to a backwash effluent was decreased to ⅕ of that in Example 1, and an examination was made about an effect given to the membrane filtration flux of the separation membrane. The supply amount of ozone was 20 mgO$_3$ per liter of the backwash effluent. The total amount of the backwash effluent treated with ozone was returned to the bioreactor. In the conventional example, the membrane filtration flux of the separation membrane was 2.0 m/day. On the other hand, in the present example, the flux was 2.4 m/day. Thus, it was verified that the membrane filtration performance was greatly improved by the ozone treatment. As described above, it was verified that the membrane filtration performance was improved even by a very small amount of ozone.

The invention claimed is:

1. A side stream type membrane bioreactor process of circulating in-tank water inside a bioreactor into a separation membrane placed outside the bioreactor, thereby taking out filtered water, wherein a backwash effluent containing foulant that is generated by backwashing the separation membrane is subjected to ozone treatment, and further the treated effluent is returned to the bioreactor.

2. The side stream type membrane bioreactor process according to claim 1, wherein by the ozone treatment, the foulants are made into a size finer than a membrane pore size of the separation membrane.

3. The side stream type membrane bioreactor process according to claim 1, wherein the supply amount of ozone in the ozone treatment is set into the range of 20 to 100 mgO$_3$ per liter of the backwash effluent.

4. The side stream type membrane bioreactor process according to claim 1, wherein the separation membrane is a ceramic monolithic membrane.

5. The side stream type membrane bioreactor process according to claim 4, wherein the separation membrane has a primary side channel having a circular cross-section or a polygonal cross-section.

6. The side stream type membrane bioreactor process according to claim 1, wherein the backwash effluent is subjected to the ozone treatment and further returned to the bioreactor, thereby keeping the MLSS concentration in the in-tank water in the bioreactor in the range of 5000 to 20000 mg/L.

7. The side stream type membrane bioreactor process according to claim 1, wherein the frequency of the backwashing is in the range of once every 10 minutes to once every 3 hours.

* * * * *